United States Patent [19]

Amjadi

[11] Patent Number: 5,111,408
[45] Date of Patent: May 5, 1992

[54] DIGITAL IMAGE DOCUMENTATION SYSTEM

[75] Inventor: Kamran Amjadi, Citrus Heights, Calif.

[73] Assignee: Hewlett-Packard Company, Palo Alto, Calif.

[21] Appl. No.: 617,298

[22] Filed: Nov. 19, 1990

Related U.S. Application Data

[63] Continuation of Ser. No. 259,650, Oct. 19, 1988, abandoned.

[51] Int. Cl.⁵ .............................................. G06F 15/46
[52] U.S. Cl. .................................. 364/514; 364/474.24
[58] Field of Search ........... 364/514, 146, 468, 474.24, 364/900, 192, 521; 358/101, 256; 382/8

[56] References Cited

U.S. PATENT DOCUMENTS

| | | | |
|---|---|---|---|
| 4,587,633 | 5/1986 | Wang et al. | 364/900 |
| 4,627,015 | 12/1986 | Stephens | 364/900 |
| 4,695,975 | 9/1987 | Bedris | 364/900 |
| 4,845,634 | 7/1989 | Vitek et al. | 364/474.24 |

OTHER PUBLICATIONS

Docudraft; "Complete Documentation Management for the Manufacturing Company".

Primary Examiner—Parshotam S. Lall
Assistant Examiner—Ellis B. Ramirez

[57] ABSTRACT

A plurality of digital images of an article used in manufacturing are created. Once created the digital images are scaled and combined to form a display. Each digital image is displayed in a separate section of the display. For example, one section may include an image of the printed circuit board scaled such that it is possible to determine the orientation of the printed circuit board in a manufacturing tray. Another section may include a close up of a label on the printed circuit board. Another section may include an image of the printed circuit board scaled such that the manufacturing technician is able to determine the relative position of a plurality of labels on the printed circuit board. Text is then added to the display which further describes to the manufacturing technician what he is viewing. The display is then stored with the added text and displayed to the manufacturing technician during manufacture. A computer program which oversees manufacture of circuit boards may automatically retrieve the digital image and display the digital image to the manufacturing technician upon the manufacture of the circuit board reaching a predetermined stage.

13 Claims, 9 Drawing Sheets

Figure 7

DIGITAL IMAGE DOCUMENTATION SYSTEM

This is a continuation of copending application Ser. No. 07/259,650 filed on Oct. 19, 1988, now abandoned.

BACKGROUND AND SUMMARY OF THE INVENTION

Documentation is useful for manufacturing in the areas of training and reference. High quality documentation provides recognizable depictions of articles used in manufacture and clear instructions as to how the article is to be utilized. Typically, high quality documentation which include clear pictures of articles have been provided only through the use of "hard copy" or printed materials. High quality documentation with accurate pictorial representations of articles used in manufacture are not generally electronically available for display upon a monitor.

SUMMARY OF THE INVENTION

In accordance with the preferred embodiment of the present invention a method for the provision of electronic documentation to a manufacturing technician is presented. A plurality of digital images of an article used in manufacturing are created. The article may be, for example a printed circuit board. Once created the digital images are scaled and combined to form a display. Each digital image is displayed in a separate section of the display. For example, one section may include an image of the printed circuit board scaled such that it is possible to determine the orientation of the printed circuit board in a manufacturing tray. Another second may include a close up of a label on the printed circuit board. Another section may include an image of the printed circuit board scaled such that the manufacturing technician is able to determined the relative position of a plurality of labels on the printed circuit board.

Text is then added to the display which further describes to the manufacturing technician what he is viewing. The display is then stored with the added text and displayed to the manufacturing technician during manufacture. For example, a computer program which oversees manufacture of circuit boards may automatically retrieve the digital image and display the digital image to the manufacturing technician upon the manufacture of the circuit board reaching a predetermined stage.

DESCRIPTION OF THE PREFERRED EMBODIMENT

Figure 1:
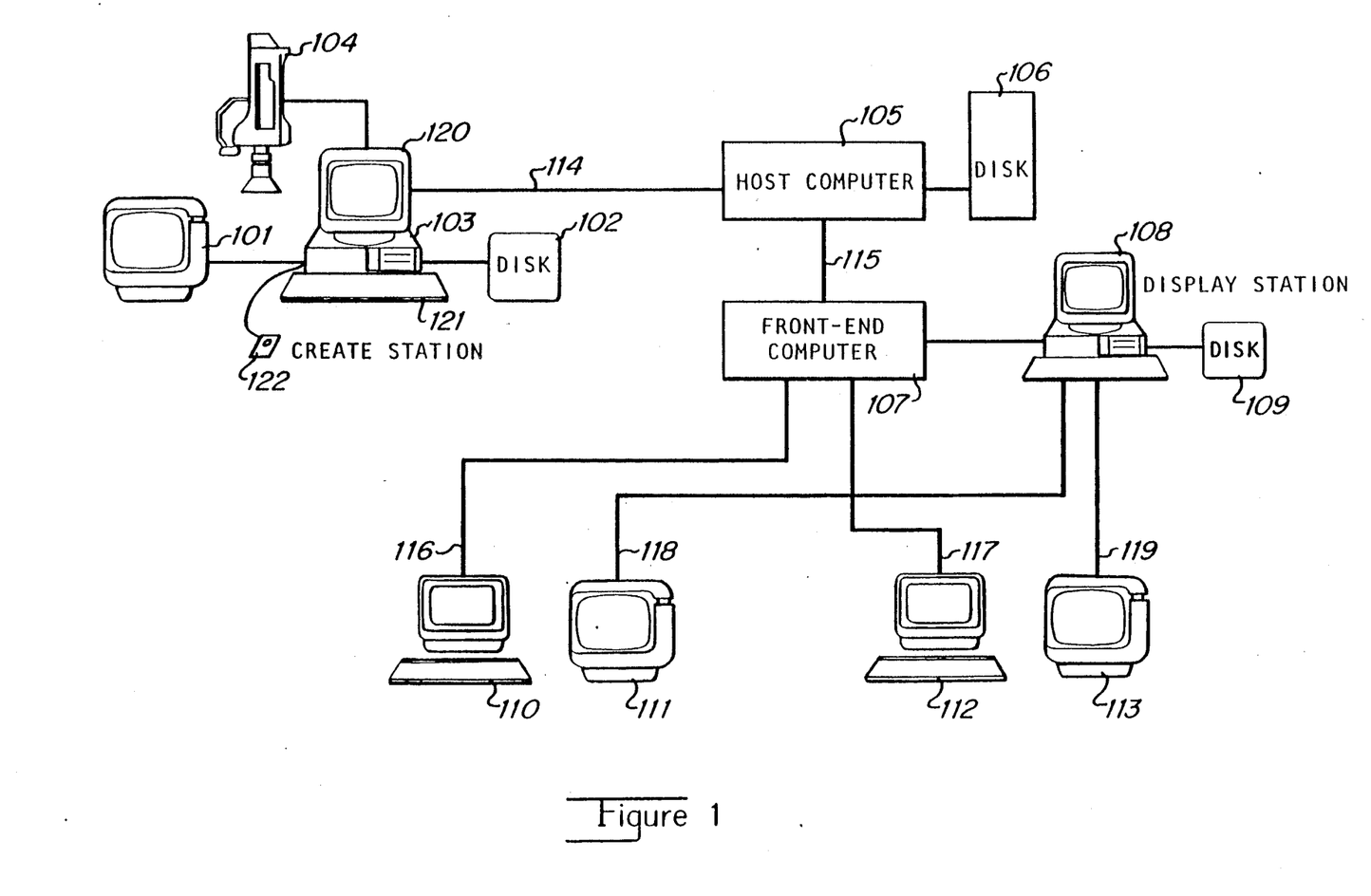
FIG. 1 is a block diagram of hardware a digital image documentation system in accordance with the preferred embodiment of the present invention.

In FIG. 1, hardware for a create system which creates documentation is shown to consist of a camera 104, a personal computer 103, a RGB (red, green and blue) monitor 101, and a disk drive 102. Camera 104 may be, for example, an RGB camera sold by Sony Corporation of Japan. Disk drive 102 may be, for example, a 142 megabyte hard disk drive such as those available form Hewlett Packard Company, a California Corporation having a business address of 3000 Hanover Street, Palo Alto, Calif. 94304.

Personal computer 103 may be, for example, a Vectra personal computer available from Hewlett Packard Company. Personal computer 103 contains a raster graphics adapter board such as a Truevison Advanced Raster Graphics Adapter 16 (TARGA 16) board available from AT&T Corporation. A TARGA 16 board comes with 512 kilobytes of random access memory (RAM) and supports a spatial resolution of 512 by 400 pixels. Personal computer 103 is also equipped with a keyboard 121, a mouse 122 and an enhanced graphics adaptor (EGA) used to drive an enhanced graphics display (EGD) monitor 120.

Hardware for a display system which displays documentation created by the create system is shown to consist of a host computer 105, a disk drive 106, a front-end computer 107, a personal computer 108, a disk drive 109, a terminal 110, an RGB monitor 111, a terminal 112 and an RGB monitor 113. Host computer 105 is used to transfer information from the create system to the display system, and to manage files in the display system. Host computer 105 is also used for a variety of tasks pertaining to manufacturing not related to the present invention. Host computer 150 may be, for example, an HP1000 series A900 computer available from Hewlett Packard Company.

Front-end computer 107 is used by manufacturing technicians as a front end to host computer 105. Front-end computer 107 may be, for example, an HP1000 series A600 computer available from Hewlett Packard Company. Front-end computer 107 is used to provide processing capability for two manufacturing workstations and is used for control of other manufacturing equipment. The first of the two manufacturing workstation logically includes terminal 110 and RGB monitor 111. The second manufacturing workstation logically includes terminal 112 and RGB monitor 113.

Disk drive 106 is used by host computer 105 for general purposes. Disk drive 109 may be, for example, a 142 megabyte hard disk drive available from Hewlett Packard Company. Personal computer 108 may be, for example, a Vectra personal computer available from Hewlett Packard Company. Personal computer 108 contains two raster graphics adaptor boards—for example TARGA 16 boards—one used to generate the display on RGB monitor 111 and one sued to generate the display on RGB monitor 113.

Figure 2:
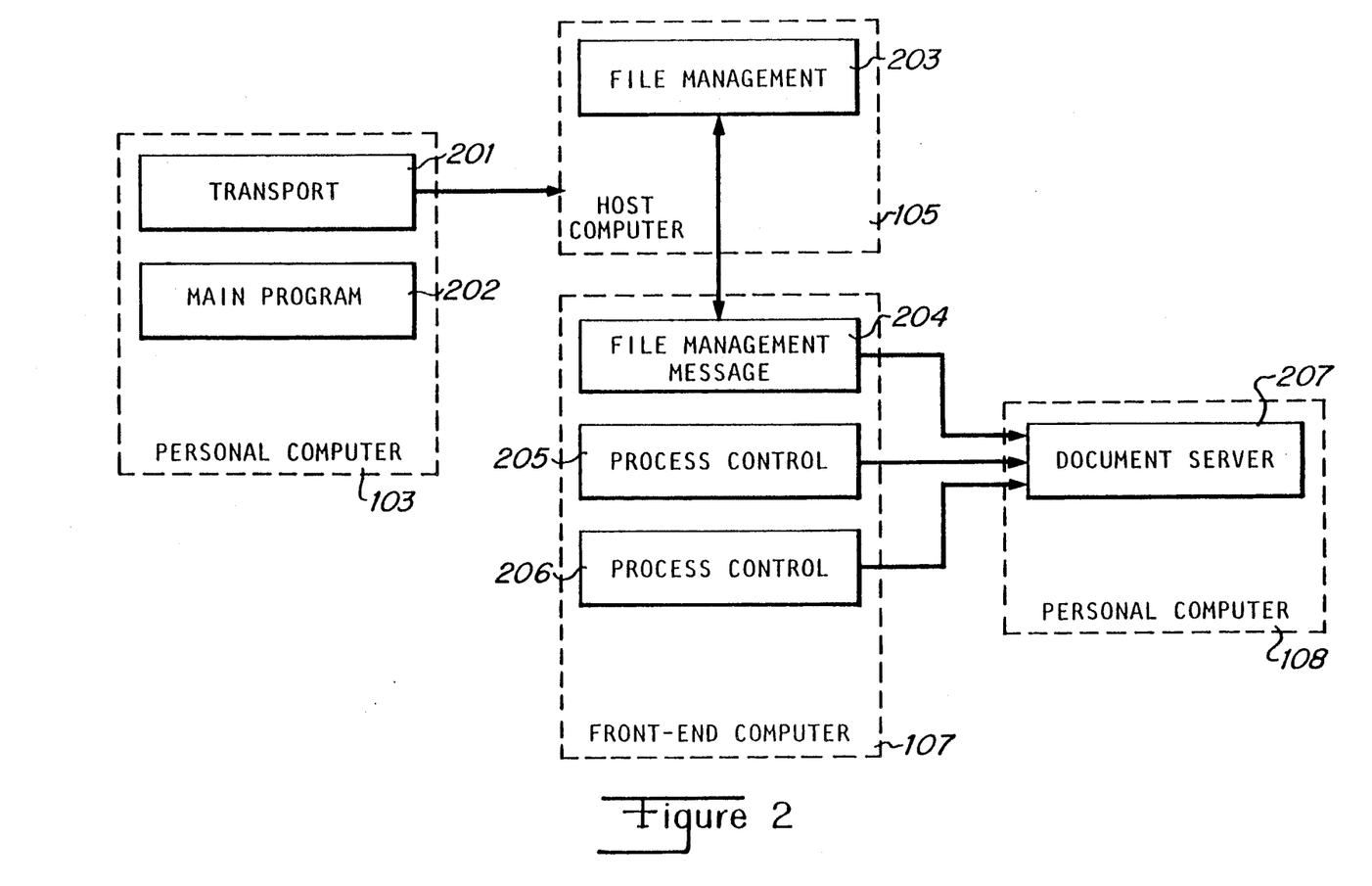
FIG. 2 is a block diagram of software used for the digital image documentation system shown in FIG. 1.

Software programs for the digital image documentation system (DIDS) are shown in FIG. 2. Within personal computer 103 runs a main program 202 and a transport program 201. Transport program 201 is used to transport information from personal computer 103 to host computer 105. Program 201 may be, for example, AdvanceLink available from Hewlett Packard Company.

Main program 202—called DIDS.EXE—has three main functions. Main program 202: (1) controls the TARGA 16 board within personal computer 103; (2) controls the EGA and thus the display on EGD monitor 120; and (3) controls input devices, i.e., mouse 122 and keyboard 121. Main program 202 may be roughly broken into routines within four levels.

The first level is the routines which interface directly to hardware, for instance, routines which interface with the TARGA 16 board, the EGA, mouse 122, keyboard 101 and the file system within disk drive 102.

The second level contains routines which perform graphics and image synthesis on images stored in the TARGA 16 board. These routines include primitives for line drawing, area filling, raster scaling, color correction and etc.

The third level routines interface to the user. These routines provide a user with direct manipulation and function key control for performing graphics operations provided by the second level routines. The third level routines will allow users to perform file management of stored images and other general level application control.

The fourth level provides the integration of the other three levels in order to produce the final application. Routines at this level provide functions like, for example, macro creation and the ability to record a set of graphics operations to a file for use as a standard template package.

Figure 3:
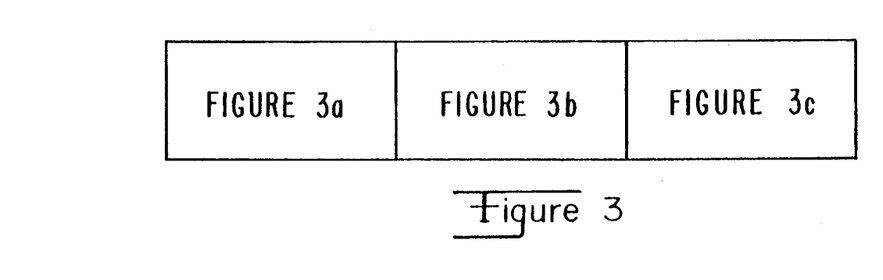
FIGS. 3A-3C show the structure and hierarchy a first program within the software shown in FIG. 2.
Figure 3A:
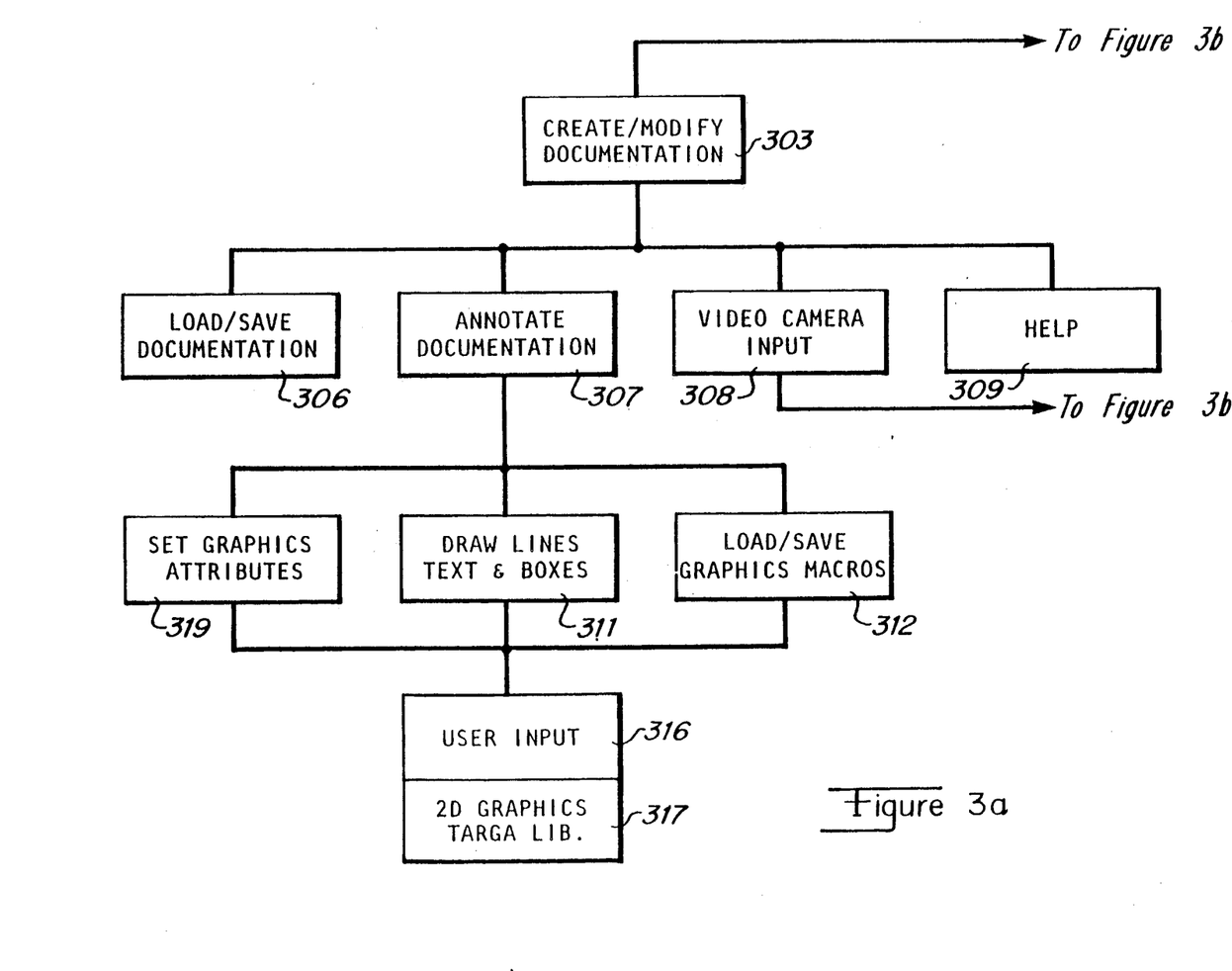
Figure 3B:
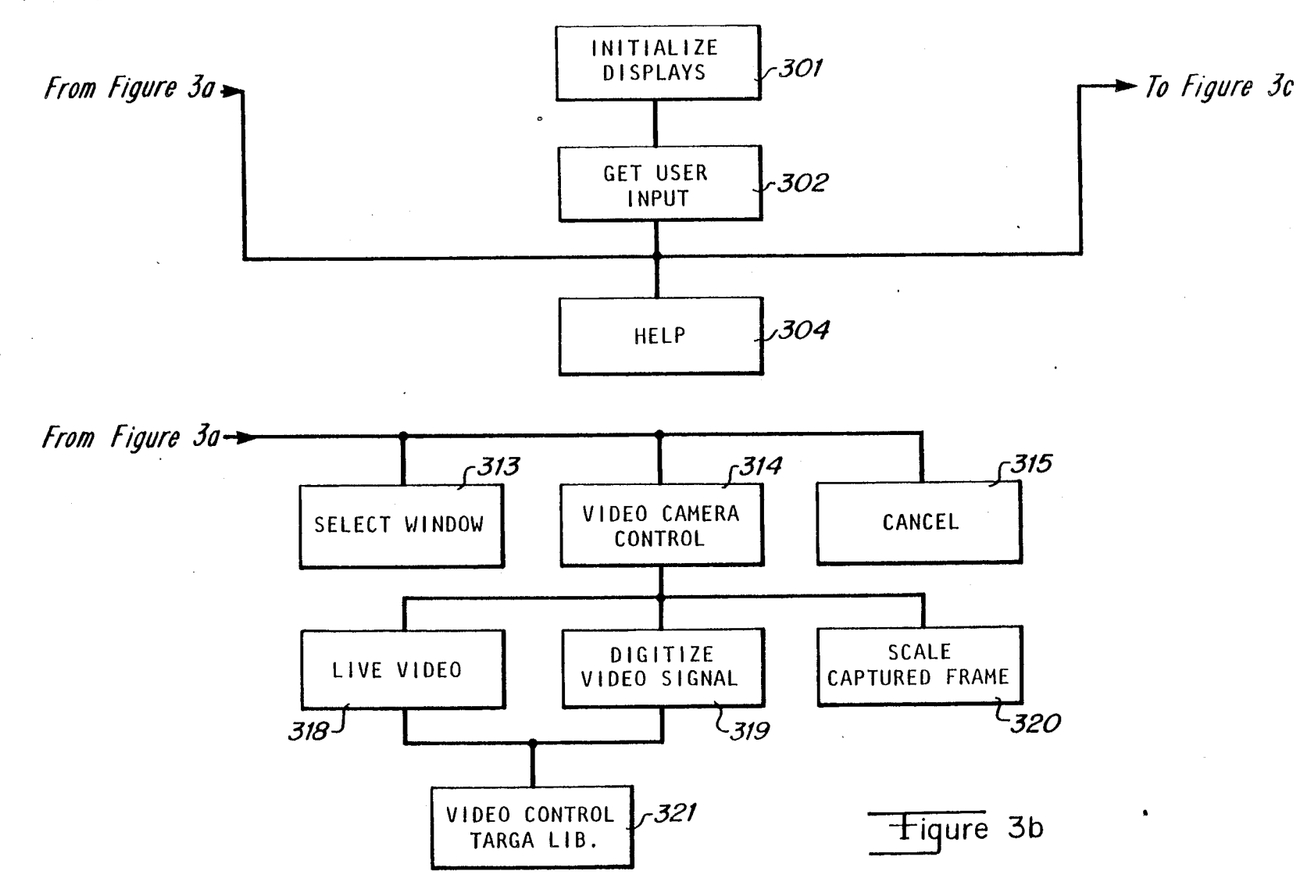
Figure 3C:
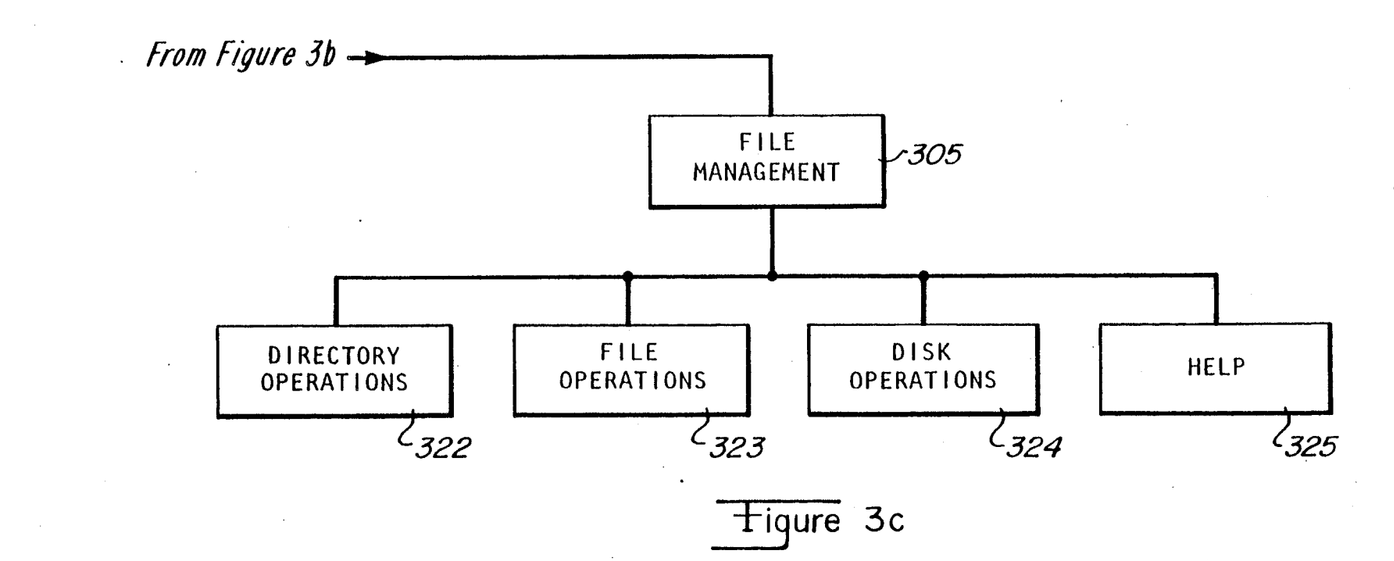

FIG. 3 shows a hierarchic overview of main program 202. Upon start-up, initialization routines 301 initialize the TARGA 16 board and the EGA. Get user input routine 302 then waits for a user to input information from either keyboard 121 or mouse 122. Main program 202 parses the information received from user to determine whether (1) the user desires some on-line assistance, (2) the user wishes to perform file management, or (3) the user wishes to create or modify documentation.

If the user requests on-line assistance, help routines 304 are called which provide on-line assistance to the user. If the user requests to manage files, file management routines 305 are called. File management routines 305 call other routines in response to user requests. Directory operations routines 322 are used to perform function on the level of directories. File operations routines 323 are used to perform functions on files. Disk operations routines 324 are used to manage disk drive 102. Help routines 325 are used to provide on-line assistance to a user in the area of file management.

If a user request to create or modify documentation, create/modify documentation routines 303 are called. Create/modify documentation routines 303 call other routines in response to user requests. Load/save documentation routines 306 are used to store documentation to disk drive 102 and to load documentation from disk drive 102. Video camera input routines 308 are used to obtain images from video camera 104. Annotate documentation routines 307 are used to annotate images obtained by video camera input routines 308. Help routines 309 are used to provide on-line assistance to a user in the area of documentation creation and modification.

Video camera input routines 308 call other routines in response to user requests. Video camera control routines 314 are used to control input from video camera 104. Select window routines 313 are used to select a predefined area of a screen (i.e., select a window). Cancel routines 315 are used to halt the processing of images form video camera 104.

Video camera control routines 314 call other routines in response to user requests. Digitize video signal routines 319 are used to digitize video signals received from video cameras 104. Live video routines 318 are used to allow real-time viewing of images from video camera 104 through the TARGA 16 board. Such viewing allows for various adjustments to be made before an image is digitized. Scale captured frame routines 320 are used to scale the digitized images from video camera 104. Live video routines 318 and digitize video signal routines 319 calls routines within video control TARGA library 321. These routines are used in the actual control of the TARGA 16 board. The TARGA 16 board, in turn is electrically connected to video camera 104 and is the interface through which personal computer 103 communicate with video camera 104.

Annotate documentation routines 307 uses other routines, in response to user requests, to annotate images obtained and digitized by video camera input routines 308., Set graphics attributes routines 310 are used to change graphics attributes such as line width, color of fill, font size, fill area, text colors and etc. Load/Save graphics macros 312 are used to store graphics macros in disk drive 102 and to retrieve a particular graphics macro from disk drive 102 when a user wishes to execute that graphics macro. Draw lines, text and boxes routines 311 are used in the actual placement of text and graphics over images generated by video camera input routines 307. Draw lines, text and boxes routines 311 through user input routines 316, receive user direction through user manipulations of keyboard 121 and mouse 122. Draw lines, text and boxes routines 311 also utilize routines within a two-dimensional graphics TARGA library 317 in the placement of graphics over images digitized and stored in the TARGA 16 board.

In the preferred embodiment, files residing on disk drive 102, may be transferred to disk drive 109 through serial interface 114. Serial interface 114, is, for example, RS232 cable. Transport program 201 transfers files from disk 102 to host computer 105. Files may then be transferred to personal computer 108 with the use of a file management program 203 and a file management message program 204. File management program 203 provides a user with the ability, from host computer 105, to remotely manage files on disk drive 109. File management message program serves as a conduit for file management instructions originating on host computer 105 and destined for execution on personal computer 108. Alternately, files might be transferred from personal computer 103 to personal computer 108 with the use of floppy disks.

A process control program 205 and a process control program 206 reside on front-end computer 107. Process control program 205 interacts with terminal 110 and process control program 206 interacts with terminal 112. Process control programs 205 and 206 oversee manufacture of printed circuit boards. For example, if a operator is using terminal 110 and is ready to manufacture a printed circuit board, the operator will, for example, identify to process control program 205 the type of printed circuit board he is manufacturing, the quantity to be manufactured etc. This information will be used to update a data base. Process control program 205 then supplies the operator with information on the manufacturing steps to be performed.

A document server program 207—called SEND.EXE—resides in personal computer 108, as shown in FIG. 2. Document server program controls hard disk 109, two TARGA 16 boards and a serial port. Document server program 207 receives file management commands from file management message program 204 and receives requests for the display of images on RGB monitor 111 or RGB monitor 113 from process control program 205 and process control program 206, respectively. As directed by these commands, server program 207 manipulates files within hard disk 109, controls the TARGA 16 boards within personal computer 108 and displays information on RGB monitor 111 or RGB monitor 113.

Figure 4:
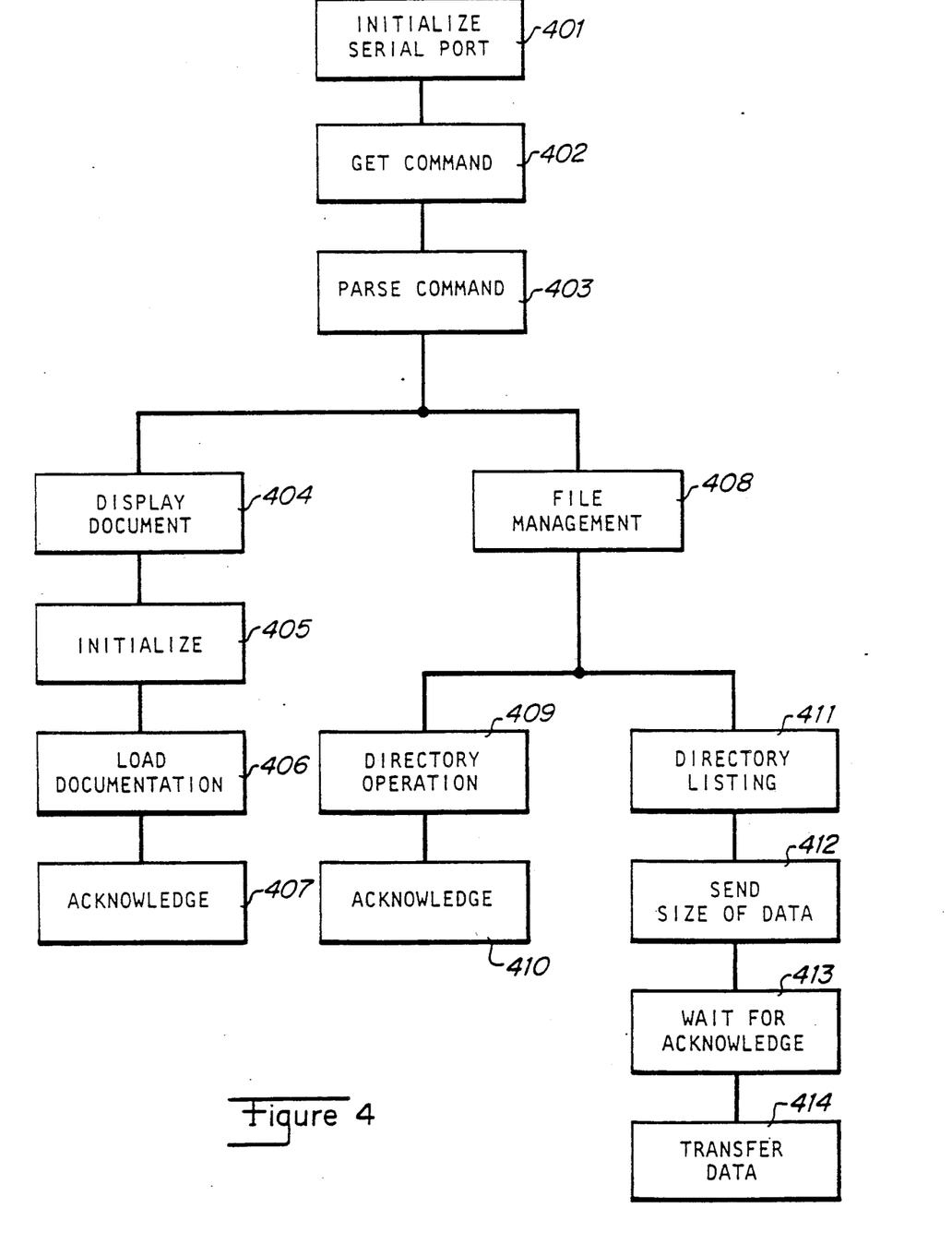
FIG. 4 shows the structure and hierarchy of a second program within the software shown in FIG. 2.

FIG. 4 shows a hierarchic overview of document server program 207. Upon start up, initialization routines 401 initialize a serial port in personal computer 108. Once initiated, get command routines 402 wait for commands from front-end computer 107 to be sent through the initialized serial port. Once a command is received parse command routines 403 parse the command.

If the command is a request to display a document, display document routines 404 process the command. Initialize routines 405 initializes the TARGA 16 board used to control RGB monitor 111, if the command requests a display on RGB monitor 111, and initialize routines 405 initialize the TARGA 16 board used to control RGB monitor 113, if the command requests a display on RGB monitor 113. Load documentation routines 406 loads documentation into the initialized TARGA 16 board for display on the selected RGB monitor. Acknowledge routines 407 notifies front-end computer 107 that the document has been displayed on the selected RGB monitor.

If the command is a request for file management file management routines 408 process the command. When the command requests an operation to be performed on a file directory, directory operation routines 409 perform the requested directory operation. Acknowledge routines 410 then notifies host computer 405 through front-end computer 107 that the requested directory operation has been performed.

When the command requests a directory listing, directory listing routines 411 process the command. Directory listing routines 411 uses send size of data routines 412 to send to front-end computer 107 the amount of data to be sent. Wait for acknowledge routines wait for front-end computer 107 to acknowledge that it is ready to receive the data. Transfer data routines 414 then transfers the data.

Figure 5:
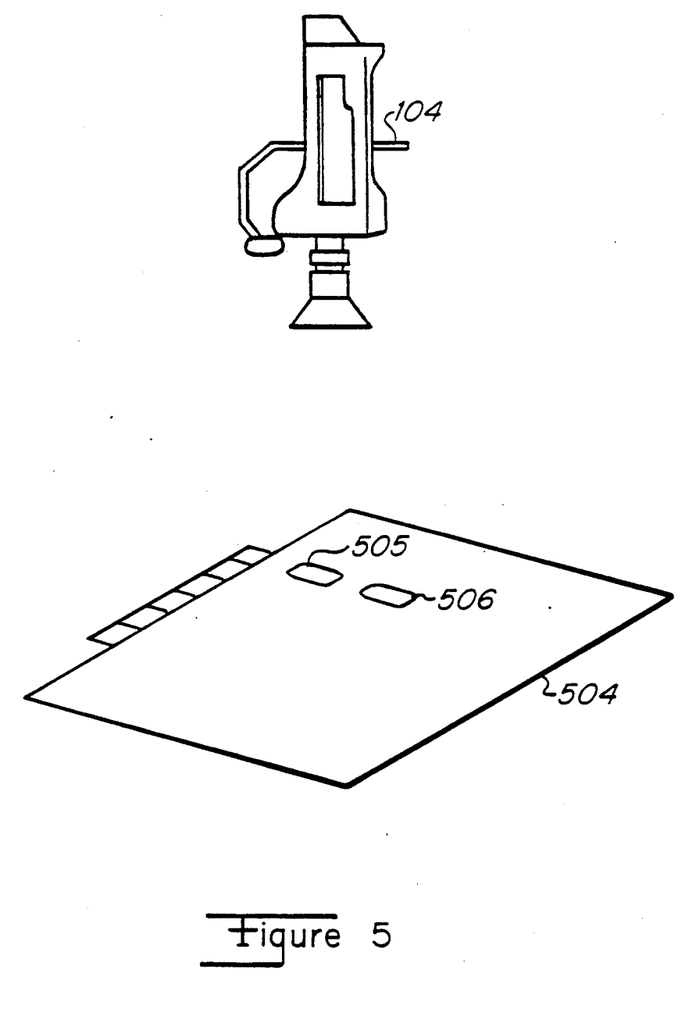
FIG. 5 shows a camera creating digital images of a printed circuit board in accordance with the preferred embodiment of the present invention.

For example, documentation which displays to a manufacturing technician the correct placement of labels may be created as shown in FIG. 5. On a prototype circuit board 504 is placed a label 505 and a label 506, as shown. Label 506 contains a date code identifying the revision of circuit board 504. Label 505 contains warranty information. Using camera 104, various pictures are taken of circuit board 504. For example a picture may be taken showing the orientation of circuit board 504 in a manufacturing tray. A picture may be taken showing the position and orientation of label 505 and label 506 on circuit board 505. A picture may be taken showing a close-up of label 505 and label 506. The pictures are digitally stored on disk 102. Also, using main program 202, boxes, text and etc., may be added to the digital images of the pictures in order to give additional information to a manufacturing technician who will utilize the pictures.

Once the images are stored in disk drive 102 they may be transported to disk drive 109, either by hand-carrying a floppy disk from personal computer 121 to personal computer 108, or by electronic transport from personal computer 103, through host computer 105, through front-end computer 107 to personal computer 108.

Once stored in disk drive 103, the images are available to be displayed on RGB monitor 111 or RGB monitor 113. For example, a certain stage of processing, process control program 205 may request personal computer 108 to display an image on RGB monitor 111. Similarly, process control program 206 may request personal computer 108 to display an image on RGB monitor 113. In the case of labels, the image may be displayed immediately upon a manufacturing technician indicating to the process control program the type of circuit board which is to be manufactured.

Figure 6:
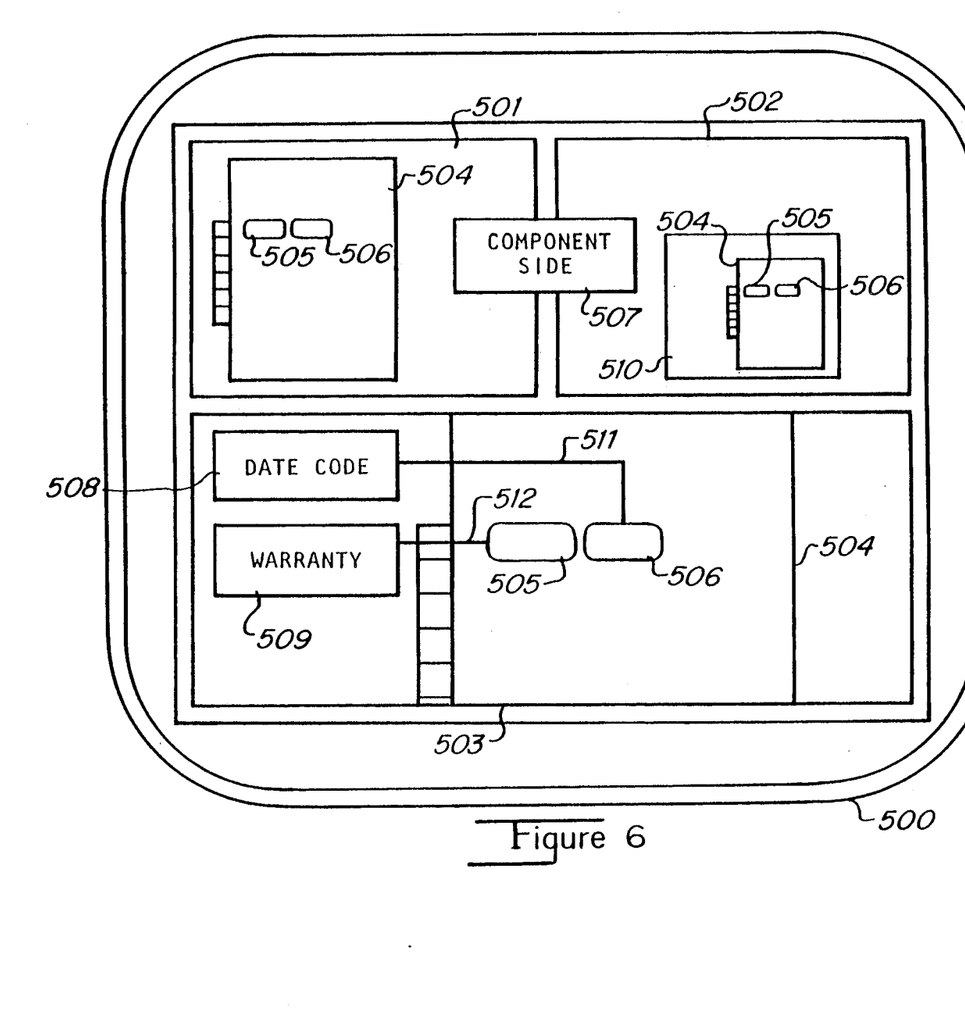
FIG. 6 shows a screen which displays a first example of data generated by the documentation shown in FIG. 1.

In FIG. 6 is shown an example of how printed circuit board 504 may be displayed on a screen 500 of RGB monitor 111. In a section 502 of screen 500, an image of circuit board 504 is shown. Within screen section 502, the image of circuit board 504 is scaled such that it is possible to determine the orientation of printed circuit board 504 in a manufacturing tray 510. In a section 501 of screen 500 an image of circuit board 504 is shown scaled so that the position and orientation of label 505 and label 506 is shown. Overlaying a portion of screen section 501 and a portion of screen section 502 is a box 50 which includes text informing a manufacturing technician that the image being shown in screen section 501 and screen section 502 is the side of circuit board 504 upon which components are placed.

In a section 503 of screen 500 an image is shown which is a close up of label 505 and label 506. Box 508 overlays a portion of screen section 503. Text within box 508 and a line 511 extending from box 508 to label 506 indicate to a manufacturing technician that label 506 contains the date code which identifies the revision of circuit board 504. Box 509 also overlays a portion of screen section 503. Text within box 509 and a line 512 extending from box 509 to label 505 indicate to a manufacturing technician that label 505 contains warranty information.

Figure 7:
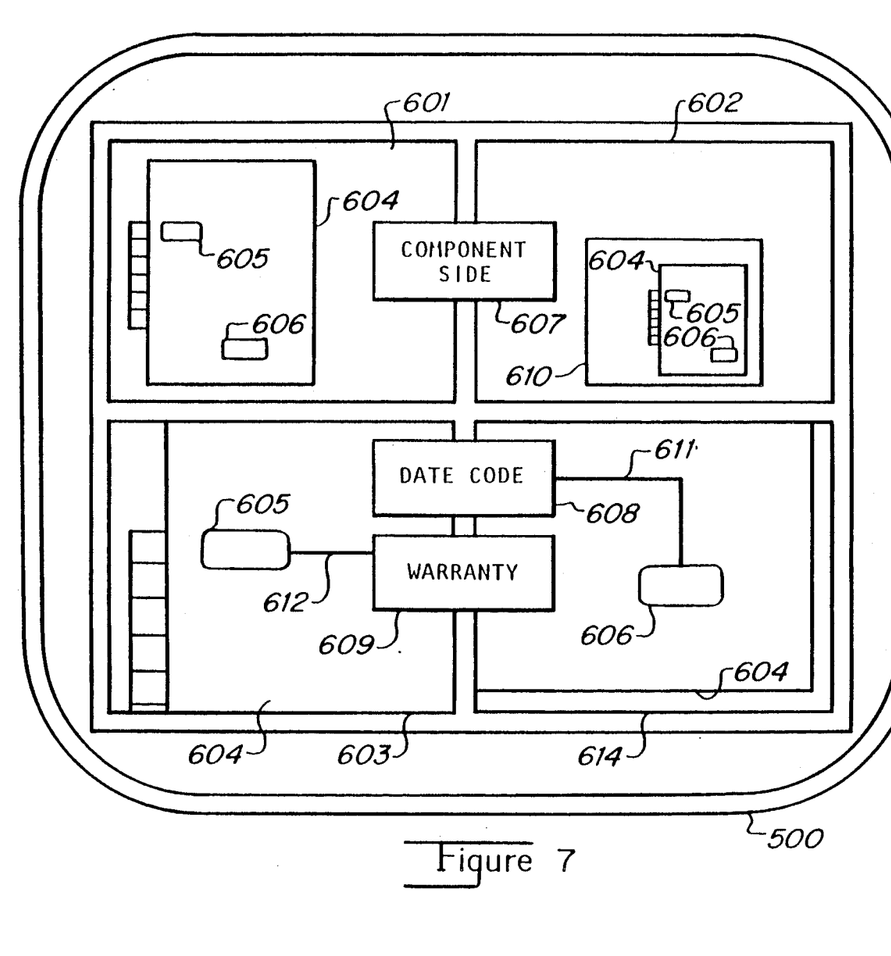
FIG. 7 shows a screen which displays a second example of data generated by the documentation shown in FIG. 2.

If two labels are placed on a circuit board at a sufficient distance apart so that it is impossible to show a close up image of both labels simultaneously on the circuit board, screen 50 may be additionally sub-divided so that there is a separate screen section for each label. For example, in FIG. 7 are shown images of a printed circuit board 604 with a label 605 and 606 placed at widely separated portions of printed circuit board 605. In a section 602 of screen 500, an image of circuit board 604 is shown. Within screen section 602, the image of circuit board 604 is scaled such that it is possible to determine the orientation of printed circuit board 604 in a manufacturing tray 610. In a section 601 of screen 500 an image of circuit board 604 is shown scaled so that the position and orientation of label 605 and lablel 606 is shown. Overlaying a portion of screen section 601 and a portion of screen section 602 is a box 607 which includes text informing a manufacturing technician that the image being shown in screen section 601 and screen section 602 is the side of circuit board 604 upon which components are placed.

In a section 603 of screen 500 an image is shown which is a close up of label 605. In a section 604 of screen 500 an image is shown which is a close up of label 606. Box 608 overlays a portion of screen section 603 and a portion of screen section 604. Text within box 608 and a line 611 extending from box 608 to label 606 indicate to a manufacturing technician that label 606 contains the date code which identifies the revision of circuit board 604. Box 609 also overlays a portion of screen section 603 and a portion of screen section 604. Text within box 609 and a line 612 extending from box 609 to label 605 indicate to a manufacturing technician that label 605 contains warranty information.

I claim:

1. A method for providing electronic documentation to a manufacturing technician about a manufacturing process, the method comprising the steps of:
   (a) creating a high resolution color digital image of an article used in the manufacturing process;
   (b) adding text to the high resolution color digital image;
   (c) storing the high resolution color digital image with the added text; and,
   (d) displaying the high resolution color digital image and the added text to the manufacturing technician during the manufacturing process.

2. A method as in claim 1 wherein step (d) is accomplished with the use of a program which monitors the manufacturing process, and which retrieves the high resolution color digital image and displays the high resolution color digital image to the manufacturing technician at a time in the manufacturing process predetermined by the program.

3. A method as in claim 1 wherein in step (a) the high resolution color digital image is created using a video camera.

4. A method for providing electronic documentation to a manufacturing technician about a manufacturing process, the method comprising the steps of:
   (a) creating a plurality of high resolution color digital images of an article used in the manufacturing process,
   (b) combining the plurality of high resolution color digital images to form a display, each high resolution color digital image being displayed in a single section of the display;
   (c) adding text to the display; p1 (d) storing the display with the added text; and,
   (e) displaying the display and the added text to the manufacturing technician during the manufacturing process.

5. A method as in claim 4 wherein in step (b) at least two digital images from the plurality of high resolution color digital images in the display are at a different scale when combined to form the display.

6. A method as in claim 4 wherein step (e) is accomplished with the use of a computer program which monitors a manufacturing process, and which retrieves the high resolution color digital image and displays the high resolution color digital image to the manufacturing technician at a time in the manufacturing process predetermined by the computer program.

7. A method as in claim 4 wherein the article is a printed circuit board and wherein a first high resolution color digital image in the plurality of high resolution color digital images created in step (a) is scaled such that it is possible to determine the orientation of the printed circuit board in a manufacturing tray.

8. A method as in claim 7 wherein a second digital image in the plurality of high resolution color digital images is a close up of a label on the printed circuit board.

9. A method as in claim 8 wherein a third high resolution color digital image in the plurality of high resolution color digital images is scaled such that the manufacturing technician is able to determine the relative position of a plurality of labels on the printed circuit board.

10. A method as in claim 9 wherein the printed text added in step (c) includes an indication to the manufacturing technician which side of the printed circuit board the plurality of high resolution color digital images is depicting.

11. A method as in claim 10 wherein the printed text added in step (c) further includes an identification to the manufacturing technician as to the subject matter of each of the plurality of labels.

12. A method as in claim 4 wherein in step (c) graphics are added in addition to the printed text.

13. A method as in claim 4 wherein in step (a) the plurality of high resolution color digital images are created using a video camera.

* * * * *